US010190822B2

(12) United States Patent
Collins, III et al.

(10) Patent No.: US 10,190,822 B2
(45) Date of Patent: Jan. 29, 2019

(54) STAGED REACTION PLENUM PARTITION WALL FOR FURNACE (71) Applicant: BLASCH PRECISION CERAMICS, INC., Albany, NY (US)

(72) Inventors: Edwin L. Collins, III, Albany, NY (US); Jeffrey J. Bolebruch, Amsterdam, NY (US); William P. Russell, Watervliet, NY (US)

(73) Assignee: Blasch Precision Ceramics, Inc., Albany, NY (US)

(*) Notice: Subject to any disclaimer, the term of this patent is extended or adjusted under 35 U.S.C. 154(b) by 0 days.

(21) Appl. No.: 15/107,545

(22) PCT Filed: Jan. 8, 2015

(86) PCT No.: PCT/US2015/010598
§ 371 (c)(1),
(2) Date: Jun. 23, 2016

(87) PCT Pub. No.: WO2015/105958
PCT Pub. Date: Jul. 16, 2015

(65) Prior Publication Data
US 2016/0320127 A1 Nov. 3, 2016

Related U.S. Application Data (60) Provisional application No. 61/925,898, filed on Jan. 10, 2014.

(51) Int. Cl.
*B01D 53/34* (2006.01)
*B01D 53/52* (2006.01)
(Continued)

(52) U.S. Cl.
CPC ......... *F27D 1/0006* (2013.01); *B01D 53/346* (2013.01); *B01D 53/52* (2013.01);
(Continued)

(58) Field of Classification Search
CPC .. F28C 3/02; F27D 1/04; F27D 1/0006; F28F 21/04; B01D 53/76; B01D 53/346;
(Continued)

(56) References Cited

U.S. PATENT DOCUMENTS 3,087,796 A * 4/1963 Latham, Jr. ............... C09C 1/50
422/150
3,088,271 A * 5/1963 Smith ........................ F01N 3/06
239/555

(Continued)

OTHER PUBLICATIONS

International Search Report and Written Opinion, International Application No. PCT/US2015/010598, dated Apr. 16, 2015 (11 pages).

(Continued)

*Primary Examiner* — Amber R Orlando
*Assistant Examiner* — Syed T Iqbal
(74) *Attorney, Agent, or Firm* — Burr & Brown, PLLC (57) ABSTRACT An array includes a plurality of refractory bricks, each having a substantially tubular body including a first end, an opposed second end, a central bore extending from the first end to the second end along the longitudinal length thereof and defining an inner surface of the refractory brick, and an outer surface extending from the first end to the second end along the longitudinal length thereof. The outer surface of each refractory brick has a shape that transitions axially between a plurality of hexagonal portions and non-hexagonal portions along the longitudinal lengths thereof, and the plurality of refractory bricks are arranged and interlocked with one another in a vertical and horizontal manner via mating members provided on the hexagonal portions of the outer surfaces thereof. A continuous plenum space is defined by the non-hexagonal portions of the refractory bricks arranged in the array.

23 Claims, 9 Drawing Sheets (51) Int. Cl.

| | |
|---|---|
| *B01D 53/58* | (2006.01) |
| *B01D 53/76* | (2006.01) |
| *C01B 17/74* | (2006.01) |
| *F27D 1/00* | (2006.01) |
| *F27D 1/04* | (2006.01) |
| *F23G 7/06* | (2006.01) |
| *F28F 21/04* | (2006.01) |
| *F28C 3/02* | (2006.01) |
| *F28D 21/00* | (2006.01) |

(52) U.S. Cl.
CPC ............. *B01D 53/58* (2013.01); *B01D 53/76* (2013.01); *C01B 17/74* (2013.01); *F23G 7/068* (2013.01); *F27D 1/04* (2013.01); *F28C 3/02* (2013.01); *F28F 21/04* (2013.01); *B01D 2251/11* (2013.01); *B01D 2258/0283* (2013.01); *F28D 2021/0056* (2013.01)

(58) Field of Classification Search
CPC ............ B01D 2258/0283; B01D 53/58; B01D 53/52; B01D 2251/11; C01B 17/74; F28D 2021/0056; F23G 7/068
See application file for complete search history.

(56) References Cited

U.S. PATENT DOCUMENTS

| | | |
|---|---|---|
| 3,376,028 A | 4/1968 | Leason et al. |
| 4,246,209 A | 1/1981 | Smith-Johannsen |
| 5,954,121 A | 9/1999 | Rexford et al. |
| 8,439,102 B1* | 5/2013 | Collins, III ............. F23G 7/068 122/512 |
| 2005/0067153 A1* | 3/2005 | Wu .......................... F28D 7/16 165/158 |
| 2011/0024094 A1 | 2/2011 | Collins, III et al. |

OTHER PUBLICATIONS

European Search Report, European Application No. 15735568.6, dated Aug. 1, 2017 (7 pp.).

European Office Action, European Application No. 15735568.6, dated Jun. 27, 2018 (6 pages).

* cited by examiner

STAGED REACTION PLENUM PARTITION WALL FOR FURNACE

BACKGROUND OF THE INVENTION

Large scale high temperature reaction furnaces are used in a variety of industrial applications including initial $H_2S$ combustion and ammonia destruction in Claus sulfur recovery units in oil refineries and gas plants, elemental sulfur combustion in the first process stage in sulfuric acid plants, decomposition of spent sulfuric acid in spent acid regeneration facilities, and other types of thermal oxidizers.

These reaction furnaces are typically refractory-lined cylinders with inside diameters ranging in size from 3 feet to diameters in excess of 20 feet, with furnace lengths ranging from 20 feet to over 100 feet long. The furnaces are configured with a large process burner at one end that discharges into a waste heat recovery boiler at the other end. The normal operating temperatures of these reaction furnaces range from 1800° F. to temperatures in excess of 3000° F., driving the need for a stable, reliable refractory lining.

The unit may have a refractory ceramic checkerwall or choke ring located part of the way down the length of the reaction furnace which, in part, functions to create two distinct reaction zones, each having its own environment and chemistry. This partition wall must be made of a refractory material because of the operating temperatures and chemistry involved in these reactions. The ability to partition reactions using these structures gives chemical engineers the ability to significantly improve the process by staging the reactions.

For example, Claus sulfur recovery units, which were originally designed to convert hydrogen sulfide generated in upstream processes to elemental sulfur, can also be used to treat effluent gas from sour water stripper units which contain ammonia. Ammonia is destroyed most effectively at the higher temperatures which can be created in the reaction furnace stage of the Claus sulfur recovery unit. By staging the process within the reaction furnace, by holding some of the hydrogen sulfide back for secondary injection part way down the combustion chamber, typically after the checkerwall or choke ring, a higher temperature is achieved just downstream of the burner since there is less hydrogen sulfide to heat up. The ammonia is more effectively destroyed at the higher temperatures, and the balance of the hydrogen sulfide is injected and converted further downstream.

Another example of staged combustion is found in decomposition furnaces used in spent acid regeneration processes. In this instance, the process is staged by holding back some of the combustion air, effectively reducing the peak process temperature immediately after the burner. Lowering this temperature reduces the generation of environmentally harmful $NO_x$ in the process stream. Secondary air is injected downstream of a baffle wall to complete the combustion process with the remaining spent acid.

Figure 1:
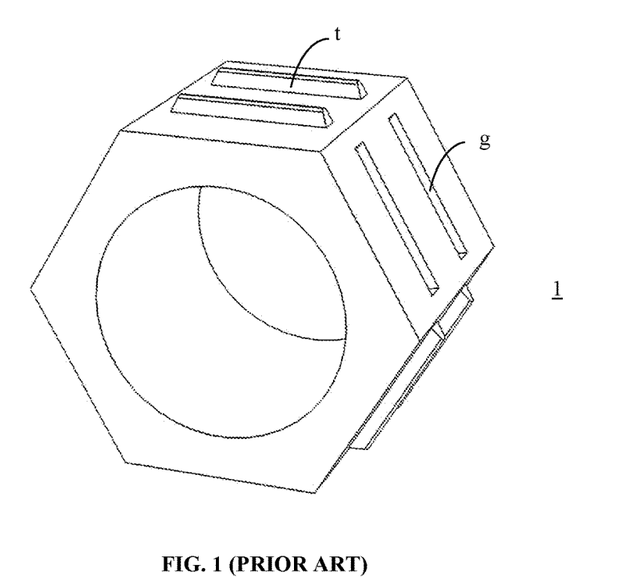
FIG. 1 is a perspective view of a hexagonal block 1 having a continuous hexagonally-shaped outer surface along the entire length thereof.
Figure 2:
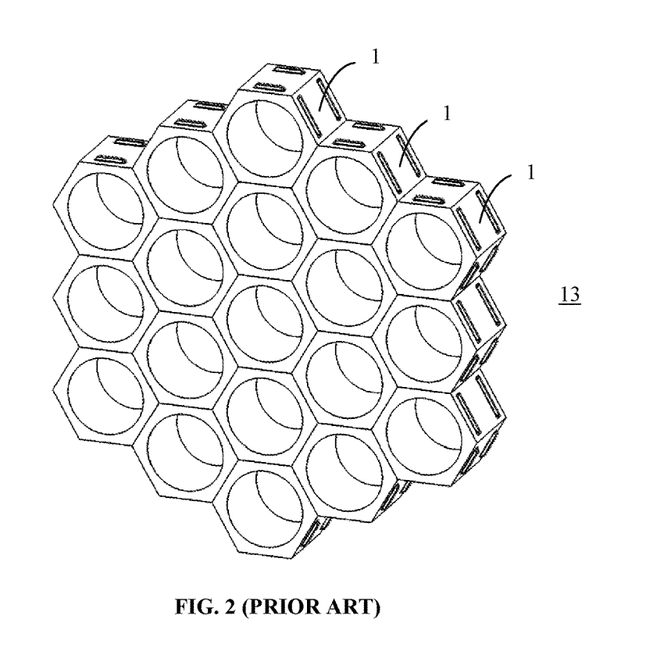
FIG. 2 is a perspective view of an array of hexagonal blocks 1 from FIG. 1 defining a an array structure for a partition wall 13.

Applicant provides a special, high reliability partition wall, also referred to as a checkerwall/bafflewall in U.S. Pat. No. 5,954,121, the entirety of which is incorporated herein, that is effectively used in these types of high temperature reaction furnaces. This partition wall design is based on the use of a plurality of stacked, precision-shaped hexagonal refractory blocks (also referred to herein as hexagonal blocks or hexblocks). For example, FIG. 1 show a hexagonal block 1 that is 8-9 inches deep (long) and has a hexagonal outer shape along the full depth (i.e., the entire longitudinal extension length) thereof, and a hexagonal cross-sectional shape. The hexagonal blocks 1 each include an engaging tongue-and-groove system, including tabs t and grooves g that interlock with one another in adjacent blocks when stacked to provide a secure and reliable array assembly (partition wall) 13, as shown in FIG. 2.

Figure 3:
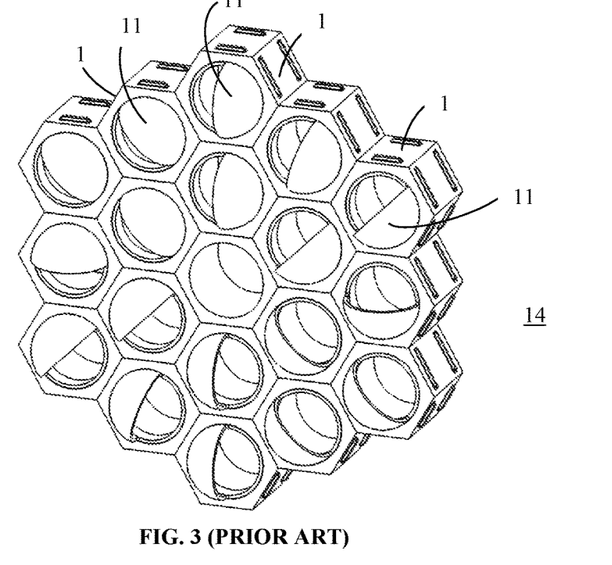
FIG. 3 is a perspective view of an array of hexagonal blocks 1 from FIG. 1 fitted with vector tiles 11 to define an array for a partition wall 14.
Figure 4:
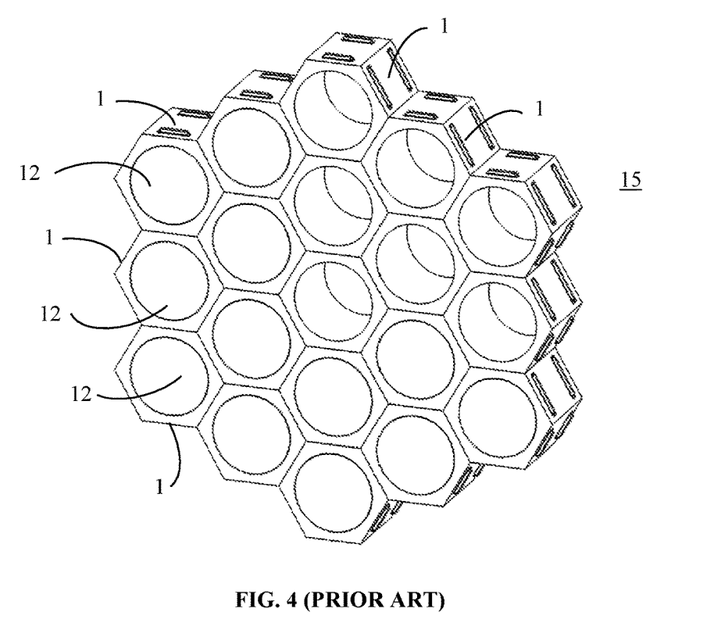
FIG. 4 is a perspective view of an array of a plurality of hexagonal blocks lfitted with blocking tiles 12 defining a baffle wall configuration 15.

In addition, Applicant also provides vector tiles 11 that can be installed in conjunction with the hexagonal blocks 1 in a partition wall configuration or array in order to control or to direct the flow of process gas downstream of the partition wall. This partition wall configuration 14, which is shown in FIG. 3, is also referred to as a VECTORWALL™ configuration, as described in U.S. Pat. No. 8,439,102, the entirety of which is incorporated herein. Furthermore, in another type of configuration, a plurality of blocking tiles 12 can be installed in some of the hexagonal blocks 1 to restrict flow through predetermined portions of the partition wall assembly to define a bafflewall 15 (see, e.g., FIG. 4).

Figure 5:
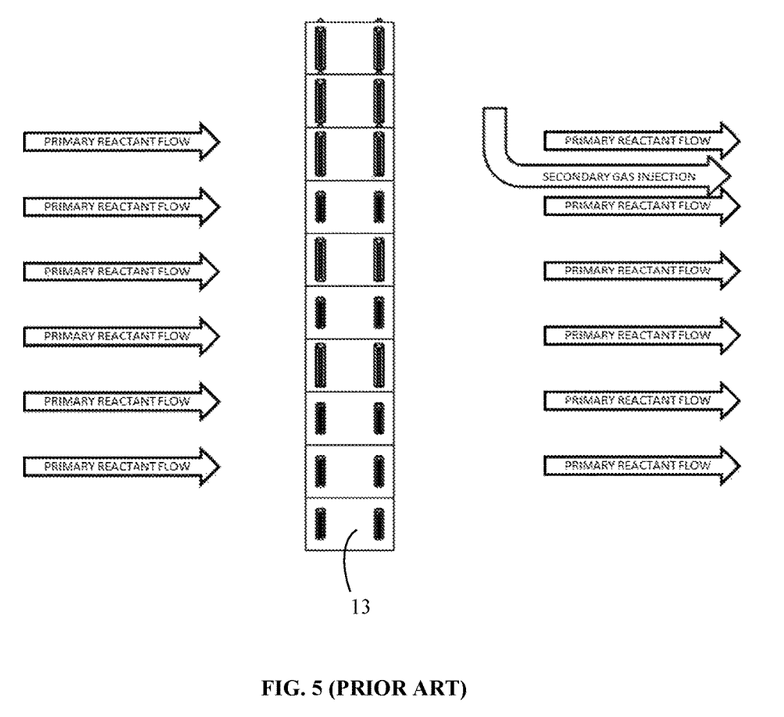
FIG. 5 is a schematic view showing the secondary injection of process gas or air conveyed into the reaction chamber through ports located just downstream of a partition wall structure 13 according to the prior art.

In the staged reaction process, the effectiveness of how well the secondary injected gas or air is distributed and mixed in the process stream governs the conversion effectiveness for the secondary flow, and, in turn, the overall conversion effectiveness of the entire chamber. Typically, these secondary injections are made at discreet single injection points, which insert the secondary gas into the process flow. Prior to the present invention, the secondary injection of process gas or air was simply conveyed into the reaction chamber through simple ports located just downstream of the checkerwall structure 13 (see, e.g., FIG. 5) or, in the case of an overflow bafflewall, just at the overflow area of the baffle wall, as discussed above. These ports may or may not be configured with a nozzle to meter or otherwise somewhat control the injection and secondary flow, as dictated by the process considerations. Typically, however, a single injection point of this type does not efficiently distribute the secondary flow throughout the overall flow field in order to achieve optimal results.

The importance of controlling the distribution of this secondary flow with respect to completing the intended reactions within the reaction chamber volume is important, and there exists a significant need for improving the uniformity of the distribution of the secondary injected gas in such reaction furnaces, thereby improving the mixing effectiveness downstream.

SUMMARY OF THE INVENTION

It is the object of the present invention to improve the uniformity of the distribution of the secondary injected gas in such reaction furnaces, thereby improving the mixing effectiveness downstream. In order to achieve the objective above, the present invention provides a refractory brick member, a refractory array and a method controlling distribution of secondary flow in a high temperature reaction furnace.

According to a first embodiment of the present invention, a refractory brick member is provided, comprising a substantially tubular body having a first end, a second end opposed to the first end along a longitudinal length of the refractory brick member, a central bore extending from the first end to the second end along the longitudinal length thereof and defining an inner surface of the refractory brick member, and an outer surface extending from the first end to the second end along the longitudinal length thereof. The outer surface of the refractory brick member has a shape that transitions axially between a plurality of hexagonally-shaped portions and a plurality of non-hexagonally-shaped portions along the longitudinal length thereof. In the present invention, the first end preferably defines a first end face of the refractory brick member having a hexagonal cross-sectional shape, and the second end defines a second end face of the refractory brick member having a hexagonal cross-sectional shape.

According to one embodiment, the outer surface shape of the refractory brick member transitions axially between three hexagonally-shaped portions and two non-hexagonally-shaped portions. In another embodiment, the outer surface shape of the refractory brick member transitions axially between four hexagonally-shaped portions and three non-hexagonally-shaped portions. Preferably, the non-hexagonally-shaped portions of the outer surface of the refractory brick member are cylindrical, a cross-sectional shape of the non-hexagonally-shaped portions of the outer surface is circular, and a cross-sectional shape of the hexagonally-shaped portions of the outer surface is hexagonal.

It is also preferred that the hexagonally-shaped portions of the outer surface of the refractory brick member further comprise at least one male interlocking mating member and one female interlocking mating member, disposed on adjacent side surfaces of the hexagonally-shaped portions with respect to one another.

Further, the refractory brick members according to the present invention also comprise at least one opening provided in a portion of the outer surface and in fluid communication with at least one of an end face and the central bore of the refractory brick member.

According to one aspect of the present invention, the at least one opening comprises an opening in a portion of the outer surface of the refractory brick member passing from one of the non-hexagonally-shaped portions of the outer surface of the refractory brick member to the inner surface thereof (i.e., the central bore). According to another aspect of the present invention, the at least one opening passes from an outer surface of the end face of the refractory brick member, through the hexagonally-shaped portion of the outer surface to communicate with a plenum space defined by a non-hexagonally-shaped portion of the outer surface of the refractory brick member. According to yet another aspect of the present invention, the at least one opening is defined by an absence of at least one corner piece of an end face of the refractory brick member. Preferably, the at least one opening according to any of the above aspects has a size in a range of ½ inches square up to 3 inches square.

According to another embodiment of the present invention, an array is provided, comprising a plurality of refractory brick members, each refractory brick member comprising a substantially tubular body having a first end, a second end opposed to the first end along a longitudinal length of the refractory brick member, a central bore extending from the first end to the second end along the longitudinal length thereof and defining an inner surface of the refractory brick member, and an outer surface extending from the first end to the second end along the longitudinal length thereof. The outer surface of each refractory brick member has a shape that transitions axially between a plurality of hexagonally-shaped portions and a plurality of non-hexagonally-shaped portions along the longitudinal lengths thereof. The plurality of refractory brick members are arranged and interlocked with one another in a vertical and horizontal manner via mating members provided on the hexagonally-shaped portions of the respective outer surfaces thereof. The array also includes a continuous plenum space defined by the non-hexagonally-shaped portions of the outer surfaces of the respective refractory brick members arranged in the array.

Preferably, each refractory brick member comprises at least one opening provided in a portion of the outer surface thereof and in fluid communication with the plenum space and at least one of an end face of the refractory brick members and the central bore of the refractory brick members.

According to a third embodiment of the present invention, a method for controlling distribution of secondary flow in a high temperature reaction furnace is provided. The method comprises the steps of providing a plenum assembly comprising a plurality of refractory brick members, each comprising a substantially tubular body having a first end, a second end opposed to the first end along a longitudinal length of the refractory brick member, a central bore extending from the first end to the second end along the longitudinal length thereof and defining an inner surface of the refractory brick member, and an outer surface extending from the first end to the second end along the longitudinal length thereof, wherein the outer surface of each refractory brick member has a shape that transitions axially between a plurality of hexagonally-shaped portions and a plurality of non-hexagonally-shaped portions along the longitudinal lengths thereof, and wherein the plurality of refractory brick members are arranged and interlocked with one another in a vertical and horizontal manner via mating members provided on the hexagonally-shaped portions of the outer surfaces thereof. The plenum assembly structure also includes a continuous plenum space defined by the non-hexagonally-shaped portions of the outer surfaces of the refractory brick members. The method further includes a step of injecting secondary air directly into the plenum space of the plenum assembly via one or more injection ports provided in fluid communication with the plenum space.

The refractory brick members according to the present invention can be made of any type of refractory material, including ceramic materials. Alumina is preferred with respect to cost considerations and ease of manufacture. Other suitable examples include refractory ceramics such as mullite. In this regard, the refractory bricks can be made many different conventional ceramic manufacturing processes such as slip casting, injection molding, and extrusion followed by machining, for example. A preferred method of forming the refractory bricks is Applicant's freeze cast process described in U.S. Pat. No. 4,246,209, the entirety of which is incorporated herein by reference.

The partition wall array (plenum assembly) configurations according to the present invention include a new type of refractory brick that can be deeper/longer than the prior art hexagonal blocks 1 (i.e., have lengths/depths ranging from 9 inches up to 24 inches), and which maintain a height to depth aspect ratio at less than 14:1 for the purposes of stability. For these refractory brick members according to the present invention, the outer shape transitions axially from hexagonal at the end face, to non-hexagonal, e.g., cylindrical, and back to hexagonal a plurality of times (see, e.g., FIGS. 6A and 6B). The cross-sectional shape of the hexagonal portions is hexagonal, whereas the cross-sectional shape of the cylindrical portions is circular.

The refractory brick members according to the present invention stack and interlock in a similar manner as the continuously hexagonally-shaped block shown in FIG. 1, however, when stacked in an array, the refractory brick members according to the present invention also beneficially provide a plenum space that is defined by the non-hexagonally-shaped portions of the outer surfaces thereof. That is, when the refractory brick members according to the present invention are stacked in an array to form a partition wall, also referenced to as a plenum assembly 7, this plenum space is continuous and interconnected through the height of the stack (see, e.g., FIG. 7). The plenum space is sealed around the outer periphery by the installation into a slot created in the hot face refractory, or by the refractory retention course formed by the use of conventional fire brick on either side in cases where the partition wall is constructed solely within the confines of the hot face lining. In either configuration, the use of compressed fiber between the partition wall and the constraining body, be it groove, or retaining ring, will not only create an expansion joint, but form a gasketed seal, as well. These sealing methods are well known by those skilled in the art.

The present invention utilizes this plenum formed by the non-hexagonally-shaped outer portions of the outer surface of the refractory brick members when the refractory brick members are stacked at installation to form an array for a partition wall structure to efficiently distribute secondary process gas or air that is injected into the plenum in a more uniform manner downstream of the partition wall assembly. That is, by connecting the secondary gas 20 injection to this plenum space 4 (see, e.g., FIG. 8), and providing one or more exits from the plenum space at a point in each refractory brick member (see, e.g., FIG. 9 and FIGS. 10A-D), the flow of the secondary injection gas 21 is distributed in a significantly more uniform manner, compared to the conventional single injection point method used in conjunction with partition walls that do not have any such plenum space.

The plenum discharge points are defined, for example, by providing at least one hole (A) in the refractory brick member downstream face 5 passing through the first hexagonally-shaped section 3B, by removing one or more corners (B) of the refractory brick member downstream face 5 in the first hexagonally-shaped section 3B, or by providing one or more holes (C) passing from the non-hexagonally shaped portion 3A of the outer surface into the central bore of the refractory brick member 3 (see, e.g., FIG. 9 and FIGS. 10A-D).

The size and quantity of plenum space discharge openings per refractory brick member are determined so as to maintain a uniform secondary gas flow rate distribution across the entire plenum assembly 7. The shape of these openings is not limited, and can be round or be other shapes (such as the case where just the corner is broken). The size of the openings can range from 0.25 square inches to over 3 square inches, for example. The overall cross-sectional area of the openings, rather than the shape thereof, affects the uniformity of the secondary gas flow rate across the entire plenum assembly 7. It should be understood by those skilled in the art that the open area of any single discharge point must be smaller than the open area of the of the secondary injection sites, such that the secondary injection flow is distributed to at least two discharge points. The individual plenum spaces, and thus the overall plenum space, must be sufficiently sized to allow for the passage of the secondary gas flow within the partition wall without being more constricting than the discharge points. The discharge points are the governing geometry that dictates the uniformity of the secondary gas flow through the plenum assembly and the preferred sizes described above. Dimensions applied in practice can be varied within the scope of the present invention as demanded by the furnace requirements and process parameters.

Injection of the secondary gas stream 20 may be accomplished at a single location, or through multiple locations spaced around the circumference of the furnace, in communication with the plenum of the partition wall (i.e., plenum assembly) 7. The number of sites and introduction location of the secondary gas stream 20 is determined by the overall size of the partition wall and the volumetric flow rate of the gas 20, which is controlled by the processing parameters. That is, the rate of secondary gas injection is governed by the furnace procedures, and not by the plenum assembly 7 itself. The plenum assembly 7 serves as a distribution system, whereby the cross-sectional area of the exit points of the plenum facilitate even gas flow distribution, but do not restrict or govern the overall secondary gas flow rates.

BRIEF DESCRIPTION OF THE DRAWINGS

For a better understanding of the nature and object of the present invention, reference should be made to the following detailed description of a preferred mode of practicing the invention, read in connection with the accompanying drawings, in which:

FIGS. 6A and 6B are perspective views of two refractory brick members according to the present invention, wherein

DETAILED DESCRIPTION OF THE INVENTION

Figure 6A:
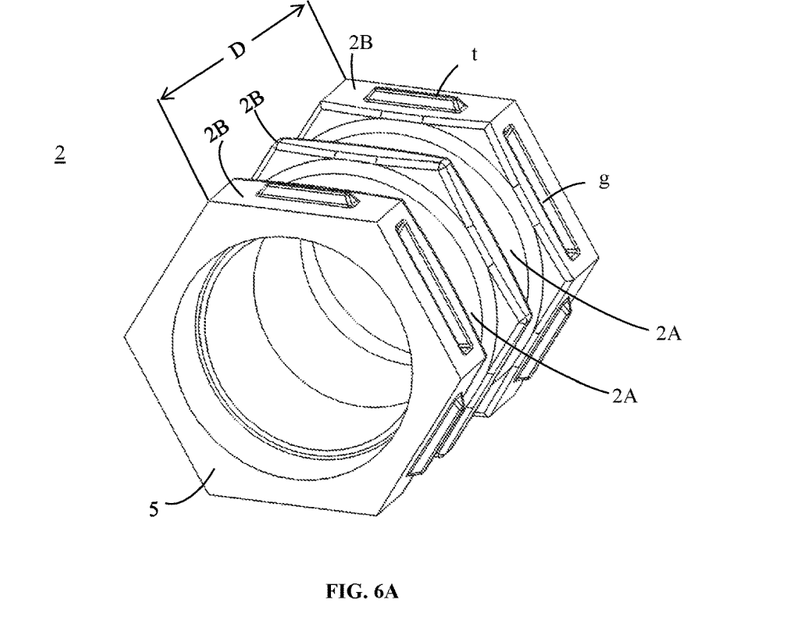
FIG. 6A is a 13.5 inch refractory brick member 2 whose outer surface has a shape that transitions axially between 3 hexagonally-shaped sections, having hexagonal cross-sectional shapes, and two cylindrical sections, having circular cross-sectional shapes, along the length (depth) thereof.
Figure 6B:
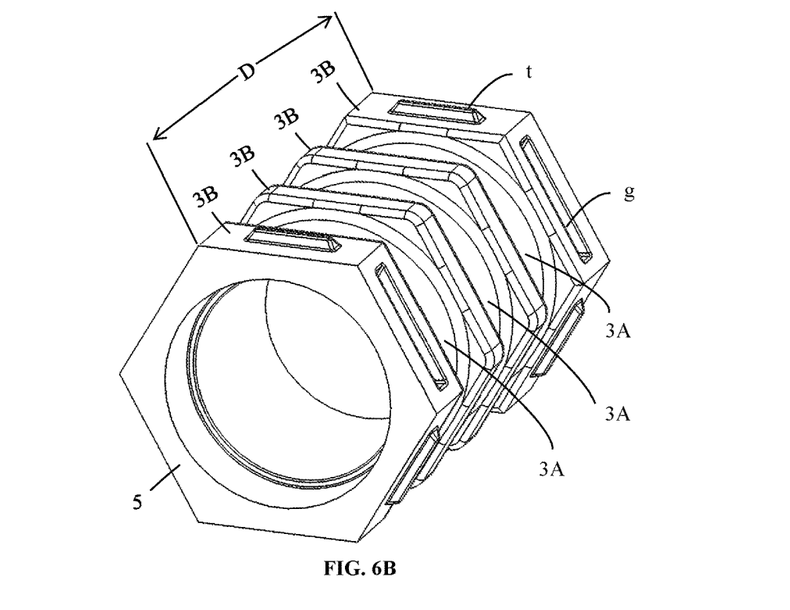
FIG. 6B is an 18 inch refractory brick member 3 whose outer surface has a shape that similarly transitions between 4 hexagonally-shaped sections and 3 cylindrical sections along the length (depth) thereof.

FIGS. 6A and 6B are perspective views of two refractory brick members taking the form of elongated blocks 2, 3 according to the present invention. FIG. 6A shows a 13.5 inch block 2, whose outer surface has a shape that transitions axially to include three hexagonally-shaped sections 2B and two cylindrical sections 2A along the depth D (which also corresponds to the longitudinal extension length) thereof. FIG. 6B shows an 18 inch block 3, whose outer shape transitions axially to include four hexagonally-shaped sections 3B and three non-hexagonally-shaped, e.g., cylindrical, sections 3A along the depth D (which also corresponds to the longitudinal extension length) thereof. The cross-sectional shapes of the hexagonally-shaped portions 2B, 3B of the outer surfaces of the respective refractory brick members 2,3 are hexagonal, whereas the cross-sectional shapes of the cylindrical portions 2A, 3A of the respective outer surfaces are circular.

Preferably, a length (depth) of each hexagonally-shaped outer section is 1 inch to 6 inches, and a length (depth) of each non-hexagonally-shaped (e.g., cylindrical) outer section is 1 inch to 6 inches. The overall length (depth) of the refractory brick members according to the present invention having the varying outer surface shapes can range from 9 inches to 24 inches, as required by the specific demands of the individual furnace. The shape of the non-hexagonally-shaped portions of the outer surface is not limited to being cylindrical, but must be sufficiently different from the shape of the hexagonally-shaped portions in cross-section to provide the desired plenums 4A and plenum space 4 discussed below.

Figure 7:
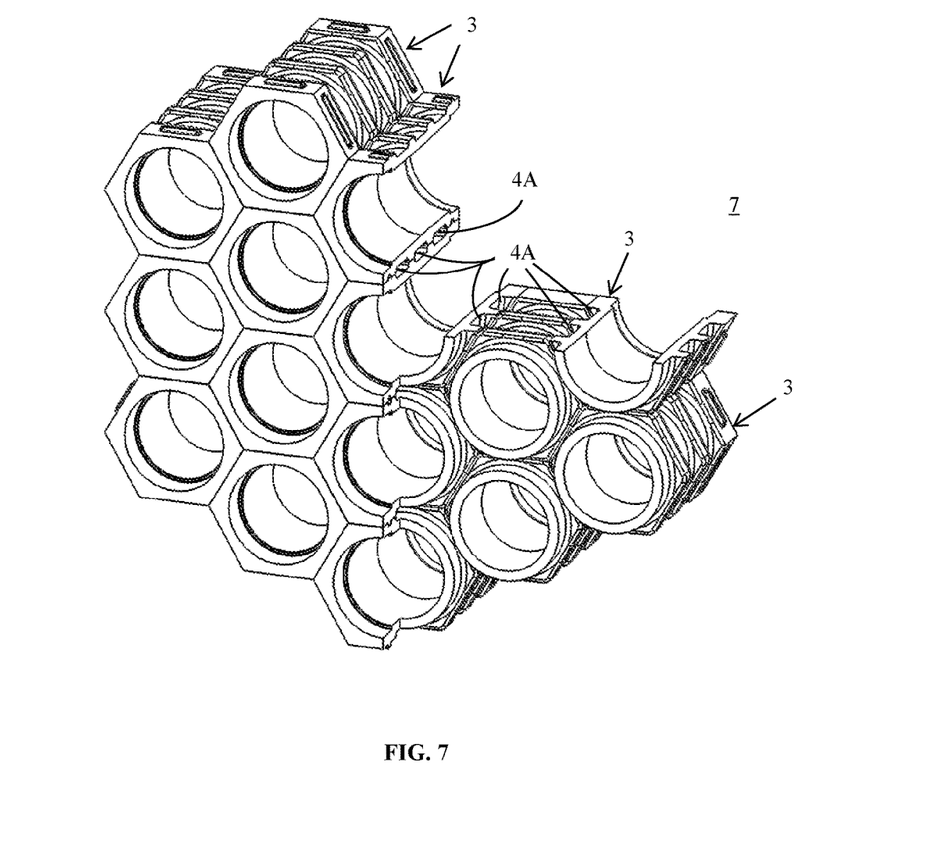
FIG. 7 is a schematic perspective cut-away view showing the formation of individual and interconnected plenums 4A when the refractory brick members 3 according to FIG. 6B are stacked in an array defining a plenum assembly 7.
Figure 8:
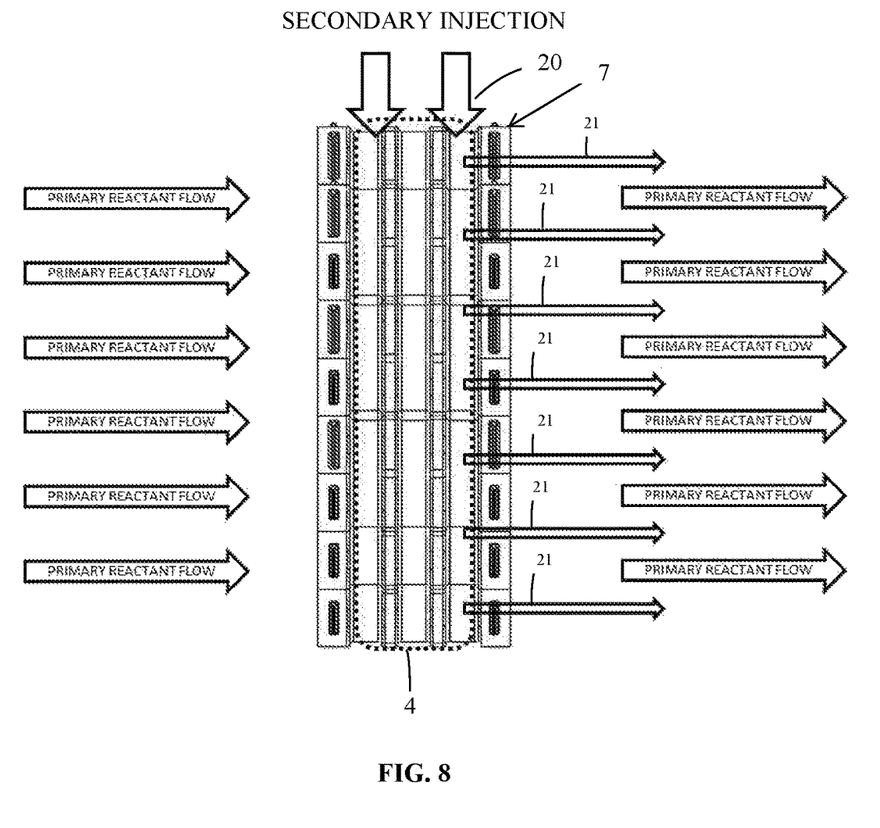
FIG. 8 is a schematic view showing one example where the secondary injection of process gas or air conveyed into the plenum space 4 through one or more ports located above the plenum assembly 7 shown in FIG. 7 according to the present invention.
Figure 9:
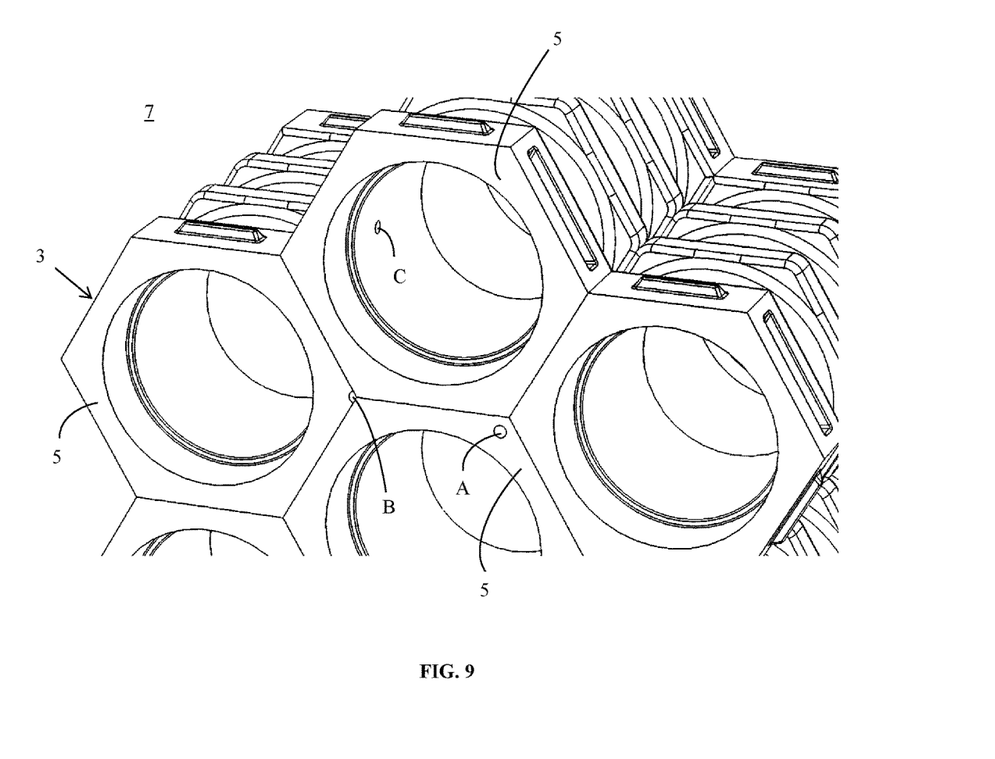
FIG. 9 is an enlarged perspective view of a portion of the plenum assembly 7 shown in FIG. 7, illustrating three different plenum discharge points (A), (B) and (C)

The refractory brick members 2, 3 each also include a plurality of mechanical interlocking mating structures, such as the tongue and grove features t, g (tabs and groves) that interconnect with one another to stably provide an interlocking array plenum assembly 7, shown in FIGS. 7-9. For example, the male mechanical mating members, tabs t, are provided on adjacent side surfaces of the hexagonally-shaped portions 3B of the outer surface with respect to the female mating members, groves g. A plurality of spaces, referred to herein as plenums 4A, are formed by the non-contacting, non-hexagonally-shaped portions 3A of the outer surfaces of the refractory brick members 3 when the refractory brick members are stacked to form the plenum assembly 7, as shown in FIG. 7.

FIG. 7 is a schematic perspective cut-away view showing a plurality of the interconnected plenums 4A that define the plenum space 4 (see, e.g., FIG. 8) when a plurality of refractory brick members 3 shown in FIG. 6B are stacked in an array to define the plenum assembly 7. When the refractory brick members 3 are stacked in an array in this manner, this plenum space 4 is continuous and interconnected through the height of the stack in the plenum assembly 7, and the plenum space 4 is sealed around the outer periphery of the array by the installation slot in the hot face refractory, or by the refractory retention course in flush installations in the known manner, as described above.

FIG. 8 is a schematic view showing the secondary injection of process gas or air 20 conveyed into the plenum space 4 through one or more ports located above or around the plenum assembly 7 according to the present invention. The plenum space 4 serves as a distribution system, whereby the cross-sectional area of the exit points of the plenum space 4 facilitate even flow distribution 21 of the secondary injected gas 20, but do not restrict or govern the overall secondary gas flow rates. As explained above, the rate of secondary gas injection is governed by the furnace procedures, and not by the plenum assembly itself.

Figure 10A:
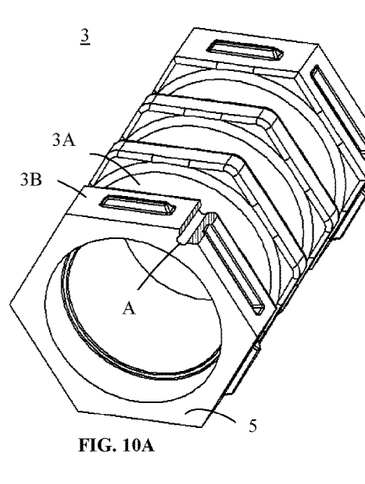
FIGS. 10A-C are perspective views showing individual refractory brick members 3 from FIG. 9 illustrating the plenum discharge point (B) and showing the plenum discharge points (A) and (C) in cut-away cross-sections.
Figure 10B:
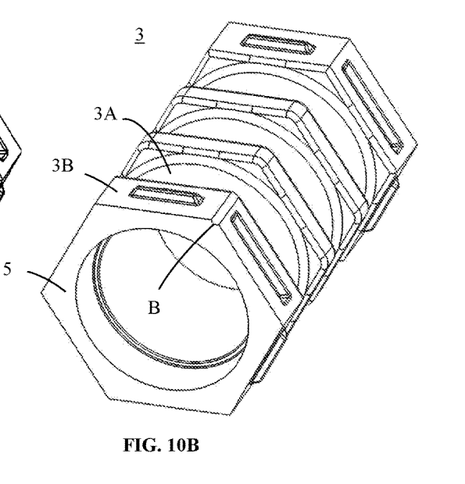
Figure 10C:
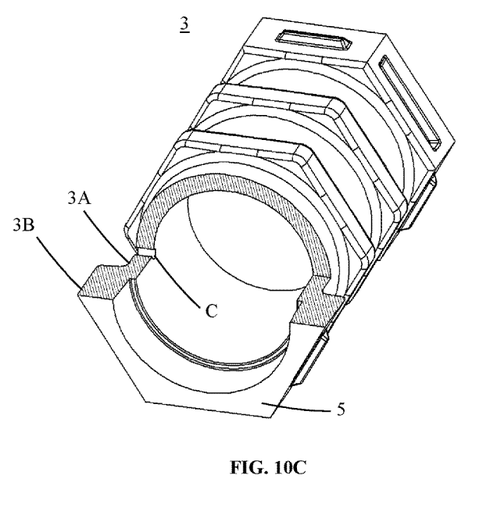
Figure 10D:
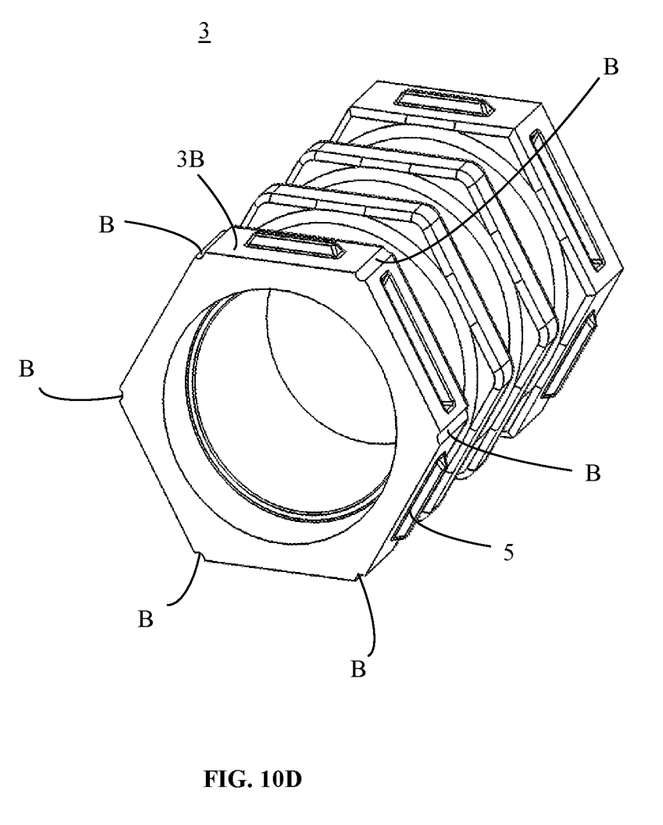
FIG. 10D is a perspective view showing a refractory brick member 3, where all of the corners of the downstream end face 5 are removed to define a plurality of plenum discharge points (B).

FIG. 9 is an enlarged perspective view of a portion of the plenum assembly 7 shown in FIG. 7, illustrating three different plenum discharge points (A), (B) and (C), and FIGS. 10A-C are perspective views showing the individual refractory brick members 3 taken from FIG. 9, showing the individual plenum discharge points (A), (B) and (C) in more detail. FIG. 10D shows another refractory brick member 3 having more than one plenum discharge point (B).

As shown in FIG. 10A, plenum discharge point (A) is defined by providing at least one hole in the downstream end face 5 of the refractory brick members 3 passing through the first hexagonally-shaped portion 3B of the outer surface of the refractory brick member 3 and in fluid communication with the plenum space (i.e., the plenum associated with the cylindrical section 3A behind the first hexagonally-shaped section 3B). Although it is not shown, the shape of the plenum discharge point (A) is not strictly limited to being circular, and the opening defining the plenum space discharge point (A) can have any other shape. Preferably, each plenum discharge point (A) has a size in a range of ½ inches square up to about 3 inches square. If the size exceeds three square inches, the proper distribution of gas within the partition wall will not be achieved. While it is not shown, it is understood that more than one plenum discharge point (A) could be provided in a single refractory brick member.

Plenum discharge point (B) shown in FIG. 10B is defined by removing at least one corner of the downstream face 5 of the first hexagonally-shaped section of the refractory brick member 3 to define an outlet in fluid communication with the plenum space. FIG. 10D shows another example including more than one plenum discharge point (B), where each corner of the downstream end face 5 of the first hexagonal section 3B of the refractory brick member 3 is removed. Plenum discharge point(s) (B) can be formed by the simple mechanical process of breaking the corner or corners of the downstream end face 5 of the refractory brick member 3 before the array is formed, or by casting the desired shape or shapes into the individual refractory brick members 3 during the initial brick fabrication steps. It is preferred to remove the corners or form the openings (B) so that each opening (B) has a size in a range of ½ inches square up to 3 inches square.

FIG. 10C shows plenum discharge point (C), which is defined by providing at least one hole in the non-hexagonally-shaped portion 3A of the outer surface of the refractory brick member 3, in fluid communication with the plenum space, passing into the central bore of the refractory brick member 3. This plenum discharge point (C) is provided before the refractory brick members 3 are stacked in the array to define the plenum assembly 7, and may be achieved by drilling the formed refractory brick member 3, or by casting the hole into the refractory brick member 3 during the initial brick fabrication steps. The size of each plenum discharge point (C) is also preferably ½ inches square up to 3 inches square. While it is not shown, it is understood that more than one plenum discharge point (C) can be provided per refractory brick member.

By connecting one or more secondary gas injection points to the plenum space 4 and providing one or more exits from the plenum space 4 at a point in each refractory brick member plenum discharge points, the flow of the secondary injection gas 21 is distributed in a significantly more uniform manner than when simply injected through a single point downstream of the partition wall, or even a plurality of points downstream of the partition wall in the conventional manner.

The above staged reaction plenum partition wall design including the refractory brick members according to the present invention is applicable to any type of partition wall design, such as standard checkerwall configurations, where all of the hexagonal blocks have open unobstructed inside diameters (e.g., FIG. 2), bafflewall configurations, where some of the hexagonal blocks have blocked inside diameters as described above (e.g., FIG. 4), and VECTORWALL™ configurations (e.g., FIG. 3), where the downstream flow of each hexagonal block is turned by vectoring tiles provided in the downstream inside diameter of each hexagonal block, as described above.

While the present invention has been shown and described above with reference to specific examples, it should be understood by those skilled in the art that the present invention is in no way limited to these examples, and that variations and modifications can readily be made thereto without departing from the scope and spirit of the present invention.

What is claimed is:

1. A refractory brick member comprising:
a substantially tubular body having a first end, a second end opposed to said first end along a longitudinal length of said tubular body, a central bore extending from said first end to said second end along said longitudinal length thereof and defining an inner surface of said refractory brick member, an outer surface extending from said first end to said second end along said longitudinal length thereof, and at least one opening provided in a portion of said outer surface of said refractory brick member and in communication with at least one of an end face of said refractory brick member and said central bore of said refractory brick member;
wherein said outer surface of said refractory brick member has a shape that transitions axially defining a plurality of alternating hexagonally-shaped portions and non-hexagonally-shaped portions along said longitudinal length thereof.

2. The refractory brick member according to claim 1, wherein said outer surface of said refractory brick member includes three hexagonally-shaped portions and two non-hexagonally-shaped portions.

3. The refractory brick member according to claim 1, wherein said outer surface of said refractory brick member includes four hexagonally-shaped portions and three non-hexagonally-shaped portions.

4. The refractory brick member according to claim 1, wherein said non-hexagonally-shaped portions of said outer surface of said refractory brick member are cylindrical.

5. The refractory brick member according to claim 1, wherein a cross-sectional shape of said non-hexagonally-shaped portions of said outer surface of said refractory brick member is circular.

6. The refractory brick member according to claim 1, wherein a cross-sectional shape of said hexagonally-shaped portions of said outer surface of said refractory brick member is hexagonal.

7. The refractory brick member according to claim 1, wherein said hexagonally-shaped portions of said outer surface of said refractory brick member further comprise at least one male interlocking mating member and one female interlocking mating member, disposed on adjacent side surfaces of said hexagonally-shaped portions of said outer surface of said refractory brick member with respect to one another.

8. The refractory brick member according to claim 1, wherein said first end defines a first end face of said refractory brick member having a hexagonal cross-sectional shape, and wherein said second end defines a second end face of said refractory brick member having a hexagonal cross-sectional shape.

9. The refractory brick member according to claim 1, wherein said at least one opening passes from one of said non-hexagonally-shaped portions of said outer surface of said refractory brick member to said central bore thereof.

10. The refractory brick member according to claim 1, wherein said at least one opening passes from said end face of said refractory brick member, through one of said hexagonally-shaped portions of said outer surface, to communicate with a plenum space defined by said non-hexagonally-shaped portions of said outer surface of said refractory brick member.

11. The refractory brick member according to claim 1, wherein said at least one opening is defined by an absence of at least one corner piece of said end face of said refractory brick member.

12. The refractory brick member according to claim 1, wherein said at least one opening has a size in a range of 1/2 inches square up to 3 inches square.

13. The refractory brick member according to claim 1, wherein a length of the hexagonally-shaped portions along the longitudinal length of the tubular body is 1 to 6 inches.

14. The refractory brick member according to claim 1, wherein a length of the non-hexagonally-shaped portions along the longitudinal length of the tubular body is 1 to 6 inches.

15. The refractory brick member according to claim 1, wherein an overall length of the tubular body is 9 to 24 inches.

16. An array comprising:
a plurality of refractory brick members, each refractory brick member comprising a substantially tubular body having a first end, a second end opposed to said first end along a longitudinal length of said refractory brick member, a central bore extending from said first end to said second end along said longitudinal length thereof and defining an inner surface of said refractory brick member, and an outer surface extending from said first end to said second end along said longitudinal length thereof, wherein said outer surface of each said refractory brick member has a shape that transitions axially between a plurality of hexagonally-shaped portions and a plurality of non-hexagonally-shaped portions along the longitudinal lengths thereof, and wherein said plurality of refractory brick members are arranged and interlocked with one another in a vertical and horizontal manner via mating members provided on said hexagonally-shaped portions of said outer surfaces thereof; and
a continuous plenum space defined by said non-hexagonally-shaped portions of said outer surfaces of said refractory brick members arranged in said array;
wherein at least one opening is provided in a portion of said outer surface of said refractory brick members and in fluid communication with said plenum and at least one of an end face of said refractory brick members and said central bore of said refractory brick members.

17. The array according to claim 16, wherein a length of the hexagonally-shaped portions along the longitudinal length of the tubular body is 1 to 6 inches.

18. The array according to claim 16, wherein a length of the non-hexagonally-shaped portions along the longitudinal length of the tubular body is 1 to 6 inches.

19. The array according to claim 16, wherein an overall length of the tubular body is 9 to 24 inches.

20. A method for controlling distribution of secondary flow in a high temperature reaction furnace, said method comprising the steps of:

providing a plenum assembly comprising
a plurality of refractory brick members, each refractory brick member comprising a substantially tubular body having a first end, a second end opposed to said first end along a longitudinal length of said refractory brick member, a central bore extending from said first end to said second end along said longitudinal length thereof and defining an inner surface of said refractory brick member, and an outer surface extending from said first end to said second end along said longitudinal length thereof, wherein said outer surface of each said refractory brick member has a shape that transitions axially between a plurality of hexagonally-shaped portions and a plurality of non-hexagonally-shaped portions along the longitudinal length thereof, and wherein said plurality of refractory brick members are arranged and interlocked with one another in a vertical and horizontal manner via mating members provided on said hexagonally-shaped portions of said outer surfaces thereof, and a continuous plenum space defined by said non-hexagonally-shaped portions of said outer surfaces of said refractory brick members, wherein each said refractory brick member comprises at least one opening provided in a portion of said outer surface of said refractory brick members and in fluid communication with said plenum and at least one of an end face of said refractory brick members and said central bore of said refractory brick members; and injecting secondary air directly into said plenum space of said plenum assembly via one or more injection ports provided in communication with said plenum space.

21. The method according to claim 20, wherein a length of the hexagonally-shaped portions along the longitudinal length of the tubular body is 1 to 6 inches.

22. The method according to claim 20, wherein a length of the non-hexagonally-shaped portions along the longitudinal length of the tubular body is 1 to 6 inches.

23. The method according to claim 20, wherein an overall length of the tubular body is 9 to 24 inches.

* * * * *